(12) United States Patent
Coutts (10) Patent No.: US 8,151,699 B2
(45) Date of Patent: Apr. 10, 2012

(54) STOVETOP GRILLING DEVICE

(76) Inventor: Stephen Coutts, Santa Monica, CA (US)

( * ) Notice: Subject to any disclaimer, the term of this patent is extended or adjusted under 35 U.S.C. 154(b) by 539 days.

(21) Appl. No.: 12/390,238

(22) Filed: Feb. 20, 2009

(65) Prior Publication Data

US 2010/0212515 A1 Aug. 26, 2010

(51) Int. Cl.
*F24C 5/04* (2006.01)
(52) U.S. Cl. ............................................. 99/445; 126/49
(58) Field of Classification Search ................ 99/422, 99/423, 425, 445, 446, 447, 450; 126/51, 126/50, 49, 18, 14, 41 R
See application file for complete search history.

(56) References Cited

U.S. PATENT DOCUMENTS

| | | | |
|---|---|---|---|
| 1,373,788 A | 4/1921 | Ball | |
| 1,956,387 A * | 4/1934 | Hartman | ........................ 99/446 |
| 3,186,331 A | 6/1965 | Dettling | |
| 3,256,806 A | 6/1966 | Jordan | |
| 3,308,747 A | 3/1967 | Spagnolo | |
| 4,598,634 A | 7/1986 | Van Horn, II | |
| 4,608,917 A | 9/1986 | Faaborg | |
| 4,729,297 A | 3/1988 | Iranzadi | |
| D296,648 S | 7/1988 | Faaborg | |
| 4,976,252 A | 12/1990 | Cianciola | |
| 5,237,914 A | 8/1993 | Carstensen | |
| D363,410 S | 10/1995 | Hazen | |
| D373,285 S | 9/1996 | Coroama et al. | |
| 5,592,871 A | 1/1997 | Bartlett | |
| 5,682,811 A | 11/1997 | Kidushim | |
| 6,158,330 A * | 12/2000 | Andress | ........................ 99/445 |
| 6,196,115 B1 | 3/2001 | Tsao | |
| 6,782,801 B1 | 8/2004 | Correa et al. | |
| 7,059,318 B2 | 6/2006 | Cornfield | |
| 7,415,922 B2 * | 8/2008 | Cheng | ............................ 99/425 |
| 7,487,717 B2 * | 2/2009 | Lauro | ............................ 99/445 |
| 2001/0023641 A1 | 9/2001 | Borner | |
| 2005/0121020 A1 * | 6/2005 | McLemore et al. | ........ 126/25 R |

* cited by examiner

*Primary Examiner* — Geoffrey S Evans
*Assistant Examiner* — Thomas Ward
(74) *Attorney, Agent, or Firm* — David A. Belasco; Belasco Jacobs & Townsley, LLP (57) ABSTRACT

A stovetop grilling device includes a catch tray that has a plurality of downward pointing V-shaped first members attached to a first frame and having parallel side edges spaced from one another by a first distance. A grilling surface has a plurality of upward pointing V-shaped second members attached to a second frame and having parallel side edges spaced from one another by the first distance. The second frame is located over the first frame with a mid-point between the parallel side edges of each of the first members centrally located between and below the parallel side edges of two adjacent second members and a mid-point between the parallel side edges of each of the second members centrally located between and above the parallel side edges of two adjacent first members. Heat follows an angled path upward to the grilling surface and food drippings flow downward to the catch tray.

40 Claims, 12 Drawing Sheets

STOVETOP GRILLING DEVICE

FIELD OF INVENTION

This invention relates to the field of cooking equipment, and more specifically to a stovetop grilling device designed to provide indoor barbeque cooking.

BACKGROUND OF THE INVENTION

There has always been a tradition of outdoor cooking and barbequing in the United States. Many Americans are fans of the wood and smoke flavoring of meat and fish cooked on an outdoor grill, often over a wood fire. Unfortunately for city dwellers, this experience is often denied them by the lack of suitable outdoor facilities. Cooking over wood fires or even over a gas grill is too messy and dangerous to be done indoors. The danger of open flames, spilled cooking grease, smoke and related conditions make indoor grill cooking impractical. The present invention provides a solution that allows the urban dweller to enjoy the outdoor grilling experience in the comfort of his or her kitchen without the mess and danger associated with traditional outdoor grill cooking.

U.S. Pat. No. 5,237,914, issued to Carstensen, is directed to a cooking grill assembly for use on a heating unit of various designs and types either charcoal fired, gas fired or electrically heated having a working surface which can support the grill assembly. The grill assembly has an upper grill component and a lower drip pan component detachably connected to each other along one margin of components that may be stamped integrally out of a single sheet of sheet metal and thereafter porcelinized if desired. The components are perforated with the perforations being laterally offset from each other in such a manner that the molten fatten grease resulting from the barbequing operation can drip downwardly through the perforations of the upper grill component are intercepted by the underlying or drip pan component and conveyed to a fat accumulation receptacle on the ladder. This arrangement allows the smoke and combustion vapors to rise upwardly through the perforations and flavor the meat in the desired manner but without the danger of the molten fat dropping on the burning fuel and being ignited thereby.

U.S. Pat. No. 3,186,331, issued to Dettling is directed to a grill for supporting food exposed to cooking temperatures comprising a plurality of parallel strips having frames for supporting the ends thereof. The side edges of these strips are bent over, the upper edge being turned down and the lower edge being turned up forming generally an S-shape. The strips are mounted so that the turned down edges overlap the up-turned edges of adjacent strips so that any drippings from the meat will fall into the trough of the lower bar and because of an inclination in the mounting will pour into a drip pan located at the lower level.

U.S. Pat. No. 4,598,634, issued to Van Horn, II is directed to a broiler/griddle for use on cooking ranges to convert the range interchangeably into a broiler for flame broiling or a griddle for frying. The portable range-top broiler and griddle apparatus has a removable and interchangeable griddle and broiling grid along with a removable base assembly which rests below the grid during broiling and acts as a secondary grease drain. When the broiler option is being used the broiling grid is placed within the fire box resting on supports which make the grid decline toward the front of the firebox so that grease and liquids drain off the grid and into a grease cup which is removably attached to the front of the firebox. The grid is formed of a series of parallel spaced steel channels. Beneath the grid a base assembly which is similar to the grid accepts the channels and spaces between the channels are wider. The base acts as a secondary grease drain catching a large quantity of the grease passing through the grid. The grid and the base have a plurality of openings through which the grease can drop and which allow heat flame and smoke to contact the food being broiled. The channels on both the base and grid are U-shaped having an open top side which faces upward so that the channels form troughs which can collect and drain off a portion of the grease.

U.S. Pat. No. 4,608,917, issued to Faaborg is directed to a stove top broiler combination for use on the top of a range or stove for converting the range at minimum cost to a charbroiler or griddle. The construction has an open topped and open bottomed rectangular base that supports a broiler surface constructed of a plurality of elongate strips bent at an angle to form troughs that are supported in a slant position so as to drain grease caught to a drip pan. This broiler grill is removable and below it are located plural larger strips with an angle forming a trough that is removably supported by notched support plates. Charcoal broiling is achieved and the flavor of cooked meat is enhanced by the horizontal lower level larger angles which burn and vaporize the drippings falling between the grids of the broiler.

U.S. Pat. No. 3,256,806, issued to Jordan is directed to an expandable and disposable pan tray and the like which can be used effectively to collect and retain liquids and grease and juices that drip from the meat when being cooked. The pan when expanded for use consists of a series of V-shaped parallel arranged troughs having peaks and valleys. Holes are placed at the top of the troughs to allow heat from the fire or other heating element to readily pass upward through the pan. The holes are placed at the upper edge of one side of the troughs to prevent grease and meat juices from dripping through the holes during broiling. Each hole is provided with a laterally extending substantially horizontal tab or cover that projects from the peak over each hole. An advantage of the present expandable pan is that it can be formed as a continuous structure of sufficient length to form a substantial number of individual pans of various sizes as required. They can be supplied so that it can be withdrawn from the container and severed at the length desired.

It is an objective of the present invention to provide a device that simulates the outdoor barbeque experience in an indoor environment. It is a further objective to provide this experience in a manner that is safe from fire hazards. It is a still further objective of the invention to provide a grilling device that prevents spattering, is easy to use and easy to clean. It is yet a further objective to a grilling device that allows for easy and effective control over the interior temperature of the grilling environment. Finally, it is an objective of the present invention to provide a grilling device that is durable, inexpensive and simple for the user to operate.

While some of the objectives of the present invention are disclosed in the prior art, none of the inventions found include all of the requirements identified.

SUMMARY OF THE INVENTION

The present invention addresses all of the deficiencies of prior art stovetop grilling device inventions and satisfies all of the objectives described above.

(1) A stovetop grilling device providing the desired features may be constructed from the following components. A catch tray is provided. The catch tray has a plurality of downward pointing V-shaped first members. Each of the first members has a first end, a second end and parallel side edges. The first members are attached at the first and second ends to a first supporting frame and have the side edges spaced from one another by a first distance. A grilling surface is provided. The grilling surface has a plurality of upward pointing V-shaped second members. Each of the second members has a proximate end, a distal end and parallel side edges. The second members are attached at the proximate and distal ends to a second supporting frame and have the side edges spaced from one another by the first distance.

The second supporting frame is located over the first supporting frame such that a mid-point between the parallel side edges of each of the first members is centrally located between and below the parallel side edges of two adjacent second members and a mid-point between the parallel side edges of each of the second members is centrally located between and above the parallel side edges of two adjacent first members. When the grilling device is placed on a stovetop burner and food is placed on the grilling surface and the burner activated, heat from the burner will follow an angled path upward to the grilling surface and drippings from the food will follow a downward path to the catch tray.

(2) In a variant of the invention, the first distance is a first predetermined distance that is uniform between each adjacent pair of first members and between each adjacent pair of second members.

(3) In another variant, the first distance is smallest at center points of the catch tray and the grilling surface and increases along a line orthogonal to the parallel side edges moving outwardly from the center points. The first distance is uniform for the catch tray and the grilling surface at any given point along the orthogonal line. A substantially even temperature is maintained across the grilling surface from the center point to outer edges of the grilling surface.

(4) In still another variant, the first distance increases exponentially from the center point to the outer edges.

(5) In yet another variant, a drip reservoir is provided. The drip reservoir is located adjacent a first side of the first supporting frame below a lowest level of the first members. The first members are attached to the first support frame at an angle sufficient to cause the drippings to flow downwardly along the first members and into the drip reservoir.

(6) In yet another variant, a grease-trapping liquid is located in the first drip reservoir.

(7) In a further variant, a first drip reservoir is provided. The first drip reservoir is located adjacent a first side of the first supporting frame below a lowest level of the first members. A second drip reservoir is provided. The second drip reservoir is located adjacent a second side of the first supporting frame below the lowest level of the first members. The first members have a high point located between the first and second ends, the high point causing the drippings to flow downwardly along the first members and into the first and second drip reservoirs.

(8) In yet a further variant, a grease-trapping liquid is located in the first and second drip reservoirs.

(9) In still a further variant, the catch tray is pivotally attached to the grilling surface at at least one first hinge.

(10) In a variant of the invention, the catch tray is removable from the grilling surface at the at least one first hinge.

(11) In another variant, the catch tray is attached to the grilling surface with at least one positioning bracket.

(12) In still another variant, a stabilizing brace is provided. The stabilizing brace is attached to a lower surface of the drip reservoirs and is sized and shaped to provide a stable surface to position the grilling device upon the stovetop burner.

(13) In a further variant, a cover is provided. The cover is sized and shaped to enclose the grilling surface.

(14) In still a further variant, the cover is pivotally attached to the grilling surface at least one second hinge.

(15) In yet a further variant, the cover is removable from the grilling surface at the at least one second hinge.

(16) In yet another variant, the cover fits slidably over the grilling surface.

(17) In still another variant, the cover further includes a vent.

(18) In a further variant, the vent is adjustable to control air flow through the cover.

(19) In still a further variant, the cover further includes a thermometer.

(20) In yet a further variant, the cover further includes a handle.

(21) In a variant of the invention, any of the first and second members are coated with a non-stick surface.

(22) In another variant, the grilling device further includes lifting handles attached to each side of the grill.

(23) In still another variant, the grilling device further includes a central handle attached to the front side of the grill.

(24) In a further variant, the first predetermined distance ranges from 0.1-0.4 inches.

(25) In yet a further variant of the invention, spacing between planar surfaces of the first members and the second members ranges from 0.075-0.375 inches.

(26) In still a further variant, each of the first and second V-shaped members further includes an portion at an apex of the V-shaped members.

(27) In another variant of the invention, the arcuate portion has a radius ranging from 0.10 to 0.75 inches.

(28) In still another variant, a stovetop grilling device, includes a catch tray. The catch tray has a plurality of downward pointing V-shaped first members. Each of the first members has a first end, a second end, a first side edge and a second side edge. The first members are attached at the first ends to a first central supporting ring. The first members are located radially outwardly from the first central ring and attached at the second ends to a first outer supporting ring. The first members are angled downwardly from the first central supporting ring to the first outer supporting ring. A grilling surface is provided. The grilling surface has a plurality of upward pointing V-shaped second members. Each of the second members has a proximate end, a distal end, a first side edge and a second side edge. The second members are attached at the proximate ends to a second central supporting ring. The second members are located radially outwardly from the second central ring and attached at the distal ends to a second outer supporting ring.

The second central supporting ring is located over the first central supporting ring and the second outer supporting ring is located over the first outer supporting ring such that a mid-point between the first and second side edges of each of the first members is centrally located between and below the first and second side edges of two adjacent second members. A mid-point between the first and second side edges of each of the second members is centrally located between and above the first and second side edges of two adjacent first members. When the grilling device is placed on a stovetop burner and food is placed on the grilling surface and the burner activated, heat from the burner will follow an angled path upward to the grilling surface and drippings from the food will follow a downward path to the catch tray.

(29) In yet another variant, the first members are sized and shaped such that the first and second side edges of adjacent first members are parallel and spaced apart by a second predetermined distance and the first and second side edges of adjacent second members are located over the first and second side edges of the adjacent first members.

(30) In another variant, the second members are sized and shaped such that the first and second side edges of adjacent second members are parallel and spaced apart by a second predetermined distance and the first and second side edges of adjacent first members are located under the first and second side edges of the adjacent second members.

(31) In a further variant, the second predetermined distance ranges from 0.1-0.4 inches.

(32) In a further variant, the second predetermined distance ranges from 0.1-0.4 inches.

(33) In still a further variant, the first and second members are sized and shaped such that the first and second side edges of adjacent first members are closely spaced adjacent the first central supporting ring and spaced farther apart adjacent the first outer supporting ring. The first and second side edges of adjacent second members are closely spaced adjacent the second central supporting ring and spaced farther apart adjacent the second outer supporting ring.

(34) In yet a further variant, a circular drip reservoir is provided. The drip reservoir is formed as a circular trough and is disposed below lowest points of the second ends of the first members.

(35) In another variant of the invention, a grease-trapping liquid located in the circular drip reservoir.

(36) In still another variant, the catch tray is attached to the grilling surface with at least one positioning bracket.

(37) In yet another variant, a stabilizing brace is provided. The stabilizing brace is attached to a lower surface of the drip reservoir and is sized and shaped to provide a stable surface to position the grilling device upon the stovetop burner.

(38) In a further variant, a cover is provided. The cover is sized and shaped to enclose the grilling surface.

(39) In still a further variant, the cover includes a vent.

(40) In yet a further variant, the vent is adjustable to control air flow through the cover.

(41) In another variant of the invention, the cover includes a thermometer.

(42) In still another variant, any of the first and second members are coated with a non-stick surface.

(43) In yet another variant, spacing between planar surfaces of the first members and the second members ranges from 0.075-0.375 inches.

(44) In a further variant, each of the first and second V-shaped members further includes an arcuate portion at an apex of the V-shaped members.

(45) In a final variant of the invention, the arcuate portion has a radius ranging from 0.10 to 0.75 inches.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT (1) FIGS. 1-6 illustrate a stovetop grilling device 10 providing the desired features that may be constructed from the following components. A catch tray 14 is provided. The catch tray 14 has a plurality of downward pointing V-shaped first members 18. Each of the first members 18 has a first end 22, a second end 26 and parallel side edges 30. The first members 18 are attached at the first 22 and second 26 ends to a first supporting frame 34 and have the side edges 30 spaced from one another by a first distance 38. A grilling surface 42 is provided. The grilling surface 42 has a plurality of upward pointing V-shaped second members 46. Each of the second members 46 has a proximate end 50, a distal end 54 and parallel side edges 58. The second members 46 are attached at the proximate 50 and distal 54 ends to a second supporting frame 62 and have the side edges 58 spaced from one another by the first distance 38.

Figure 1:
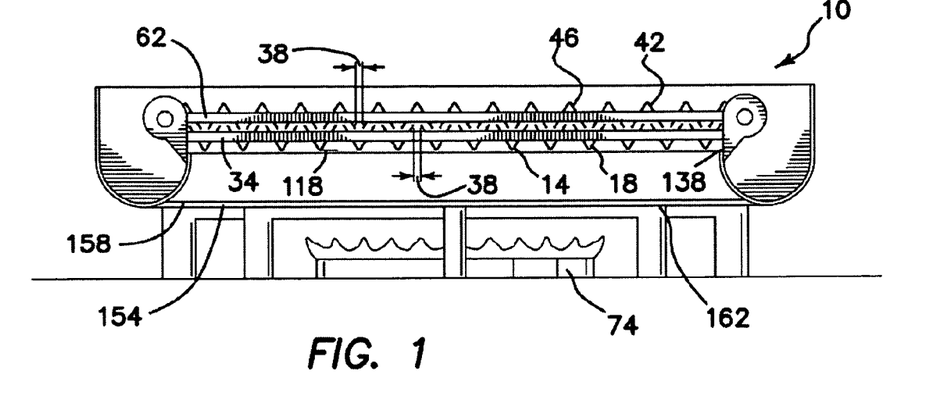
FIG. 1 is a side cross-sectional view of the preferred embodiment of the invention illustrating the catch tray, drip reservoirs, grilling surface and first and second supporting frames.
Figure 2:
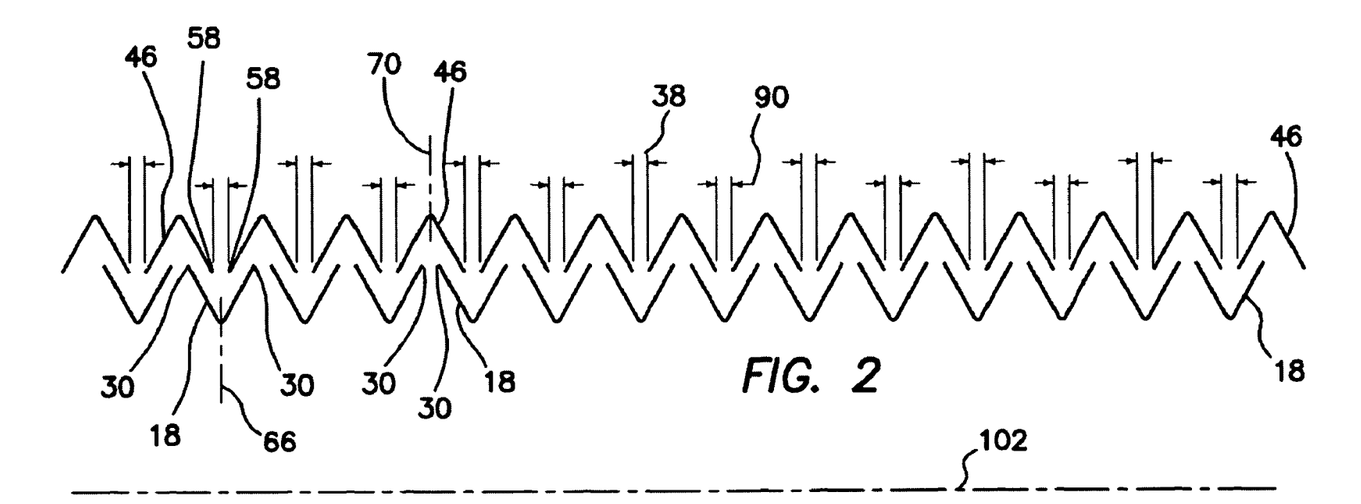
FIG. 2 is a side cross-sectional view of the catch tray and the grilling surface of the FIG. 1 embodiment illustrating even spacing of the V-shaped members.
Figure 2A:
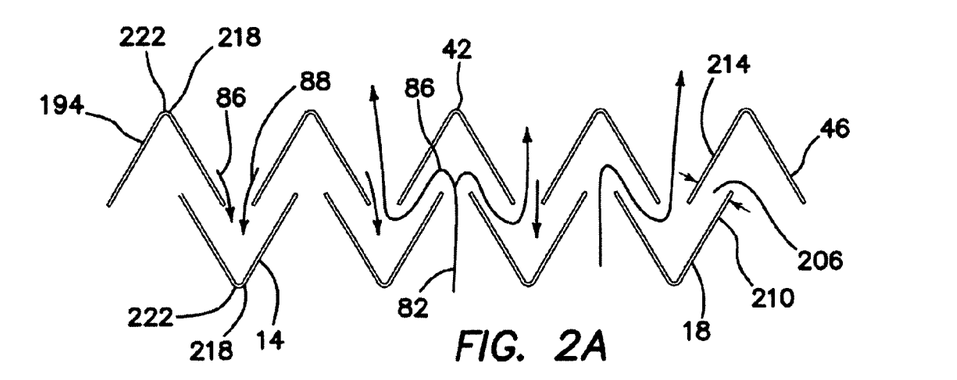
FIG. 2A is a partial side cross-sectional view of the catch tray and the grilling surface of FIG. 2 illustrating the flow of heat and grill drippings.

The second supporting frame 62, as illustrated in FIG. 2, is located over the first supporting frame 34 such that a midpoint 66 between the parallel side edges 30 of each of the first members 18 is centrally located between and below the parallel side edges 58 of two adjacent second members 46 and a mid-point 70 between the parallel side edges 58 of each of the second members 46 is centrally located between and above the parallel side edges 30 of two adjacent first members 18. When the grilling device 10 is placed on a stovetop burner 74, as illustrated in FIGS. 1 and 2A, and food (not shown) is placed on the grilling surface 42 and the burner 74 activated, heat 82 from the burner 74 will follow an angled path 86 upward to the grilling surface 42 and drippings 86 from the food will follow a downward path 88 to the catch tray 14.

(2) In a variant of the invention, as illustrated in FIG. 2, the first distance 38 is a first predetermined distance 90 that is uniform between each adjacent pair of first members 18 and between each adjacent pair of second members 46.

Figure 3:
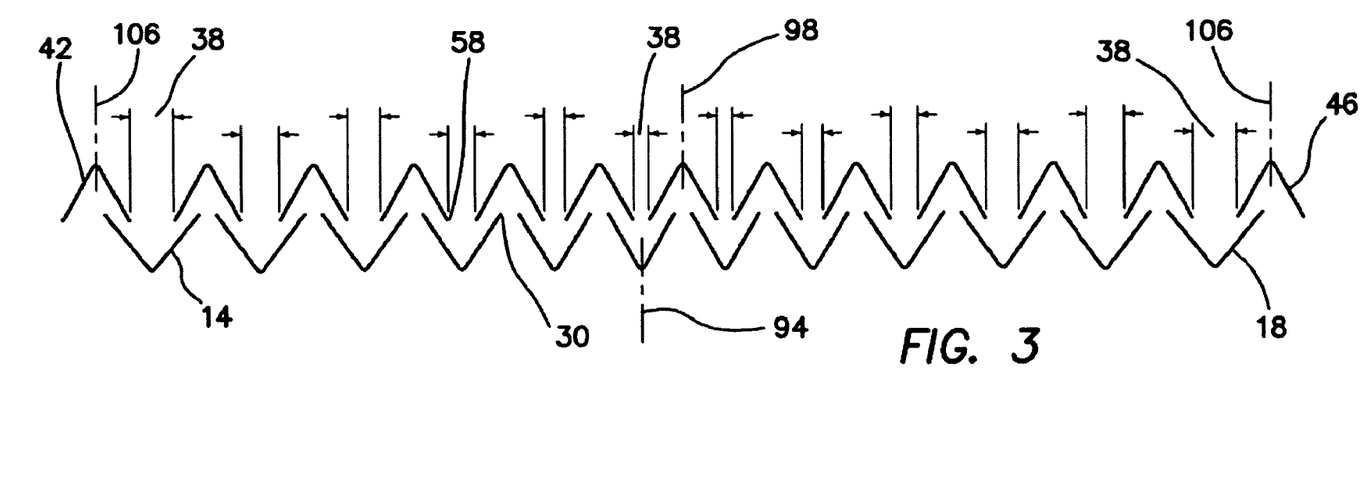
FIG. 3 is a side cross-sectional view of the catch tray and the grilling surface of a second embodiment illustrating increasing width spacing of the V-shaped members.

(3) In another variant, as illustrated in FIG. 3, the first distance 38 is smallest at center points 94, 98 of the catch tray 14 and the grilling surface 42 and increases along a line 102 orthogonal to the parallel side edges 30, 58 moving outwardly from the center points 94, 98. The first distance 38 is uniform for the catch tray 14 and the grilling surface 42 at any given point along the orthogonal line 102. A substantially even temperature is maintained across the grilling surface 42 from the center point 98 to outer edges 106 of the grilling surface 42.

(4) In still another variant, the first distance 38 increases exponentially from the center points 94, 98 to the outer edges 106.

Figure 1A:
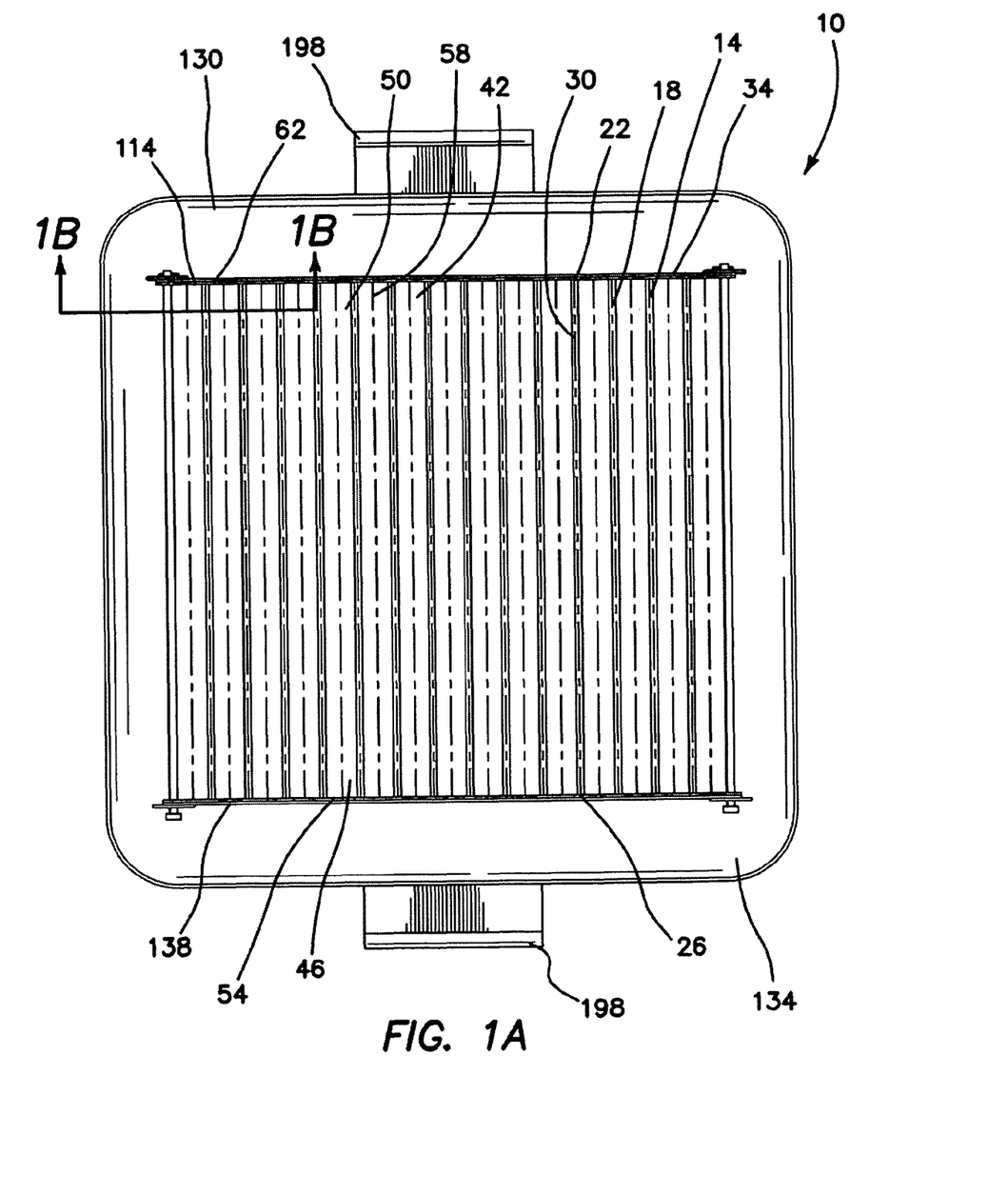
FIG. 1A is a plan view of the FIG. 1 embodiment.
Figure 1B:
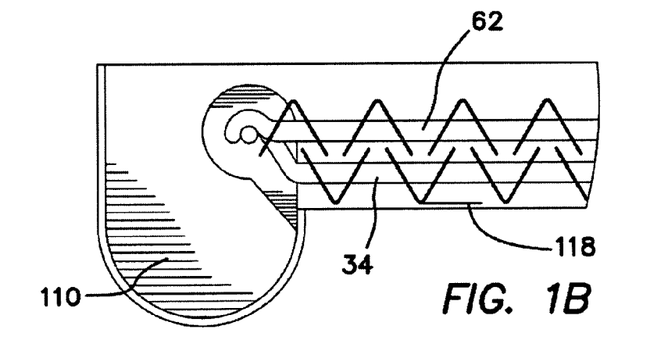
FIG. 1B is a partial side cross-sectional view taken along the line 1B-1B.
Figure 5A:
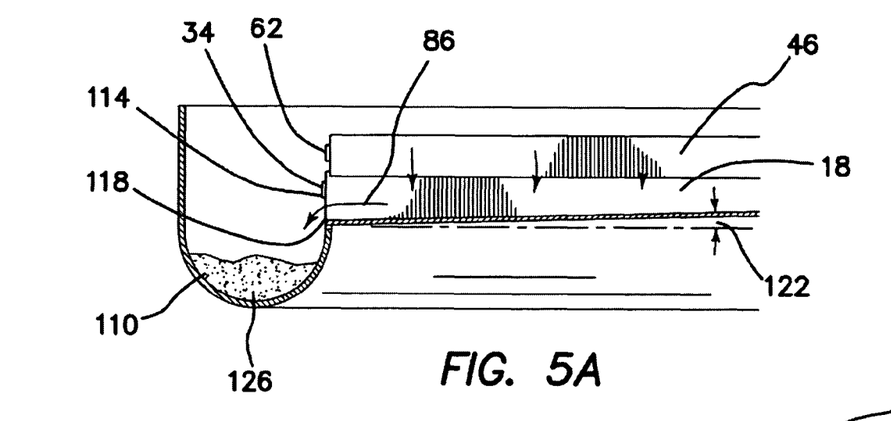
FIG. 5A is a partial cross-sectional view of a portion of the grilling surface, catch tray and drip reservoir illustrating the angled path of drippings into the drip reservoir.

(5) In yet another variant, as illustrated in FIGS. 1B and 5A, a drip reservoir 110 is provided. The drip reservoir 110 is located adjacent a first side 114 of the first supporting frame 34 below a lowest level 118 of the first members 18. The first members 18, are attached to the first support frame 34 at an angle 122 sufficient to cause the drippings 86 to flow downwardly along the first members 18 and into the drip reservoir 110.

(6) In yet another variant, a grease-trapping liquid 126 is located in the drip reservoir 110.

Figure 5B:
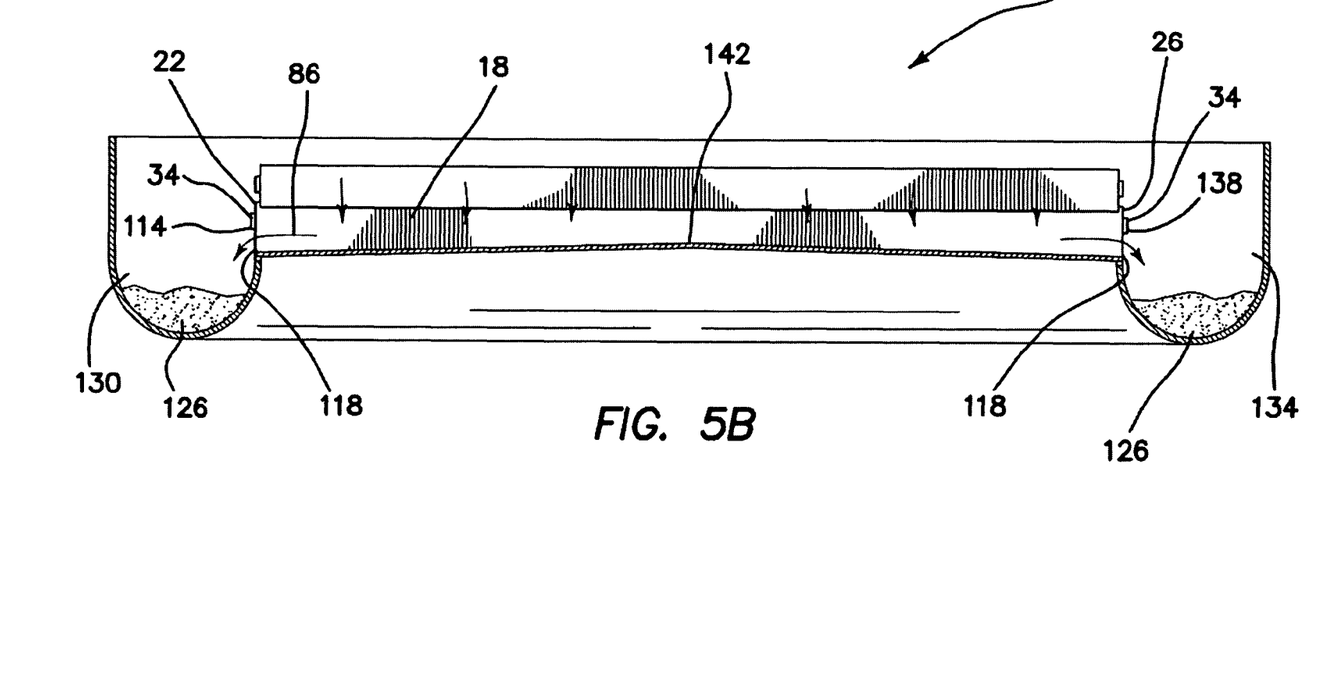
FIG. 5B is a cross-sectional view of the grilling surface, catch tray and drip reservoir illustrating a catch tray angled from a center point toward first and second drip reservoirs.

(7) In a further variant, as illustrated in FIG. 5B, a first drip reservoir 130 is provided. The first drip reservoir 130 is located adjacent a first side 114 of the first supporting frame 34 below a lowest level 118 of the first members 18. A second drip reservoir 134 is provided. The second drip reservoir 134 is located adjacent a second side 138 of the first supporting frame 34 below the lowest level 118 of the first members 18. As illustrated in FIG. 5B, the first members 18 have a high point 142 located between the first 22 and second 26 ends, the high point 142 causing the drippings 86 to flow downwardly along the first members 18 and into the first 130 and second 134 drip reservoirs.

(8) In yet a further variant, as illustrated in FIGS. 5A and 5B, a grease-trapping liquid 126 is located in the first 130 and second 134 drip reservoirs.

Figure 1C:
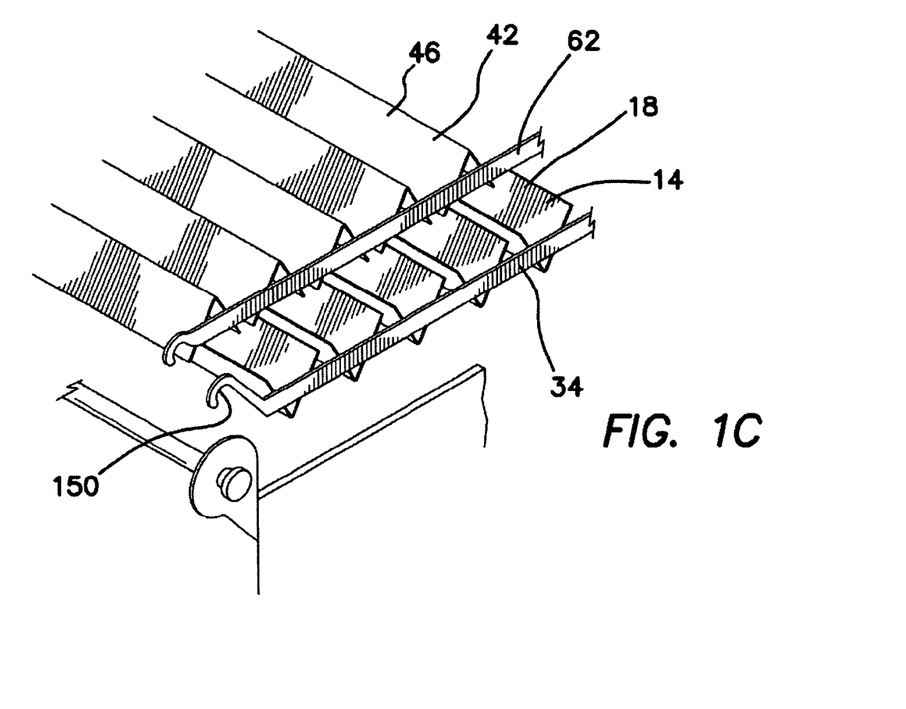
FIG. 1C is a partial perspective view of the assembly of the grilling surface and catch tray to the drip reservoirs where the grilling surface and catch tray rest on top of the drip reservoirs.
Figure 1D:
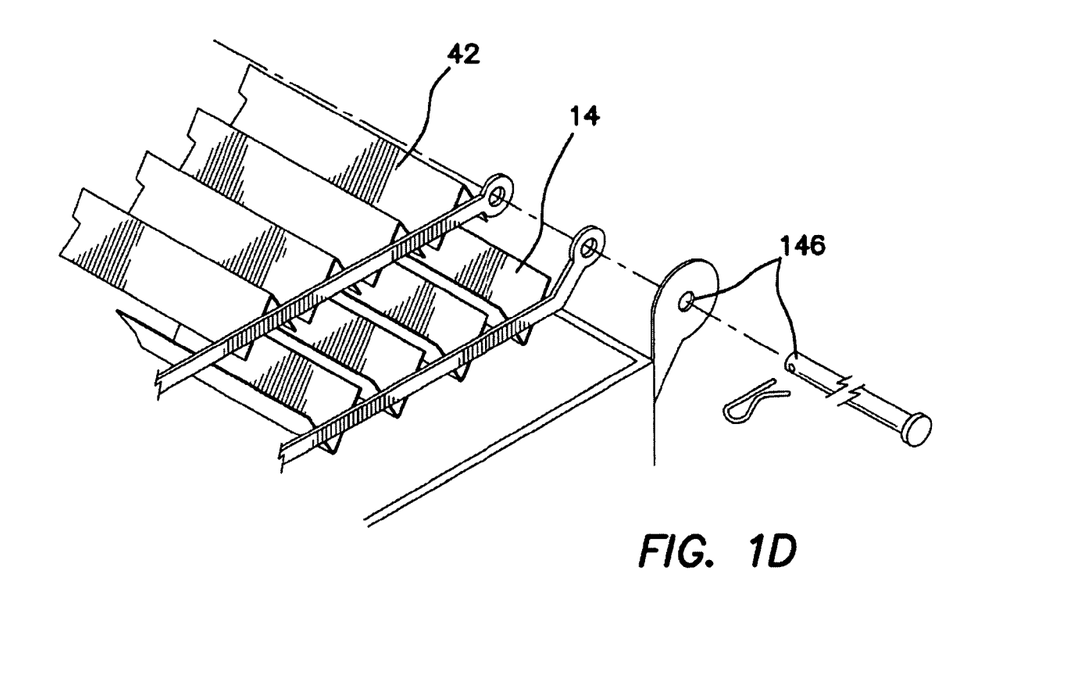
FIG. 1D is a partial perspective view of the assembly of the grilling surface and catch tray to the drip reservoirs where the grilling surface and catch tray are hingedly attached to the drip reservoirs.

(9) In still a further variant, as illustrated in FIG. 1D, the catch tray 14 is pivotally attached to the grilling surface 42 at least one first hinge 146.

(10) In a variant of the invention, the catch tray 14 is removable from the grilling surface 42 at the at least one first hinge 146.

(11) In another variant, as illustrated in FIG. 1C, the catch tray 14 is attached to the grilling surface 42 with at least one positioning bracket 150.

(12) In still another variant, as illustrated in FIG. 1, a stabilizing brace 154 is provided. The stabilizing brace 154 is attached to a lower surface 158 of the drip reservoirs 130, 134, and is sized and shaped to provide a stable surface 162 to position the grilling device 10 upon the stovetop burner 74.

Figure 4A:
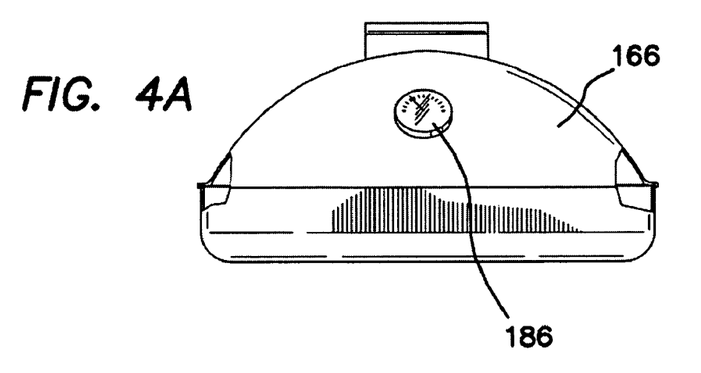
FIG. 4A is a side view of the FIG. 1 embodiment illustrating a slip-on grilling surface cover with a temperature indicator.
Figure 4B:
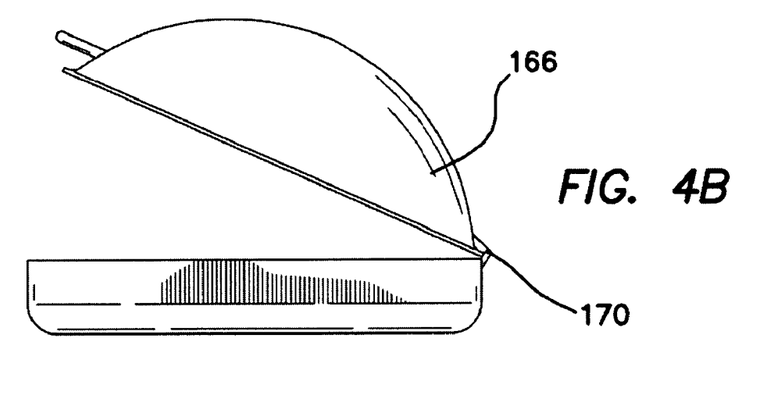
FIG. 4B is a side view of the FIG. 1 embodiment illustrating a grilling surface cover hingedly attached to the grill.
Figure 4C:
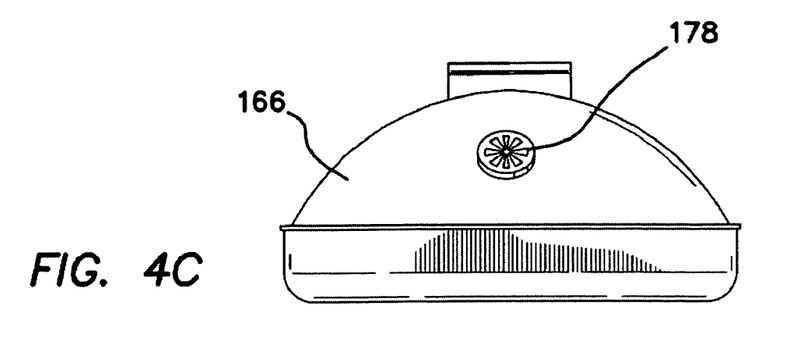
FIG. 4C is a side view of the FIG. 1 embodiment illustrating a grilling surface cover with an adjustable vent.

(13) In a further variant, as illustrated in FIGS. 4A, 4B and 4C, a cover 166 is provided. The cover 166 is sized and shaped to enclose the grilling surface 42.

(14) In still a further variant, as illustrated in FIG. 4B, the cover 166 is pivotally attached to the grilling surface 42 at least one second hinge 170.

(15) In yet a further variant, the cover 166 is removable from the grilling surface 42 at the at least one second hinge 170.

(16) In yet another variant, as illustrated in FIG. 4A, the cover 166 fits slidably over the grilling surface 42.

(17) In still another variant, as illustrated in FIG. 4C, the cover 166 further includes a vent 178.

(18) In a further variant, the vent 178 is adjustable to control air flow (not shown) through the cover 166.

(19) In still a further variant, as illustrated in FIG. 4A, the cover 166 further includes a thermometer 186.

(20) In yet a further variant, the cover 166 further includes a handle 190.

(21) In a variant of the invention, as illustrated in FIG. 2A, any of the first 18 and second 46 members are coated with a non-stick surface 194.

(22) In another variant, as illustrated in FIG. 1A, the grilling device 10 further includes lifting handles 198 attached to each side of the grill 10.

Figure 1E:
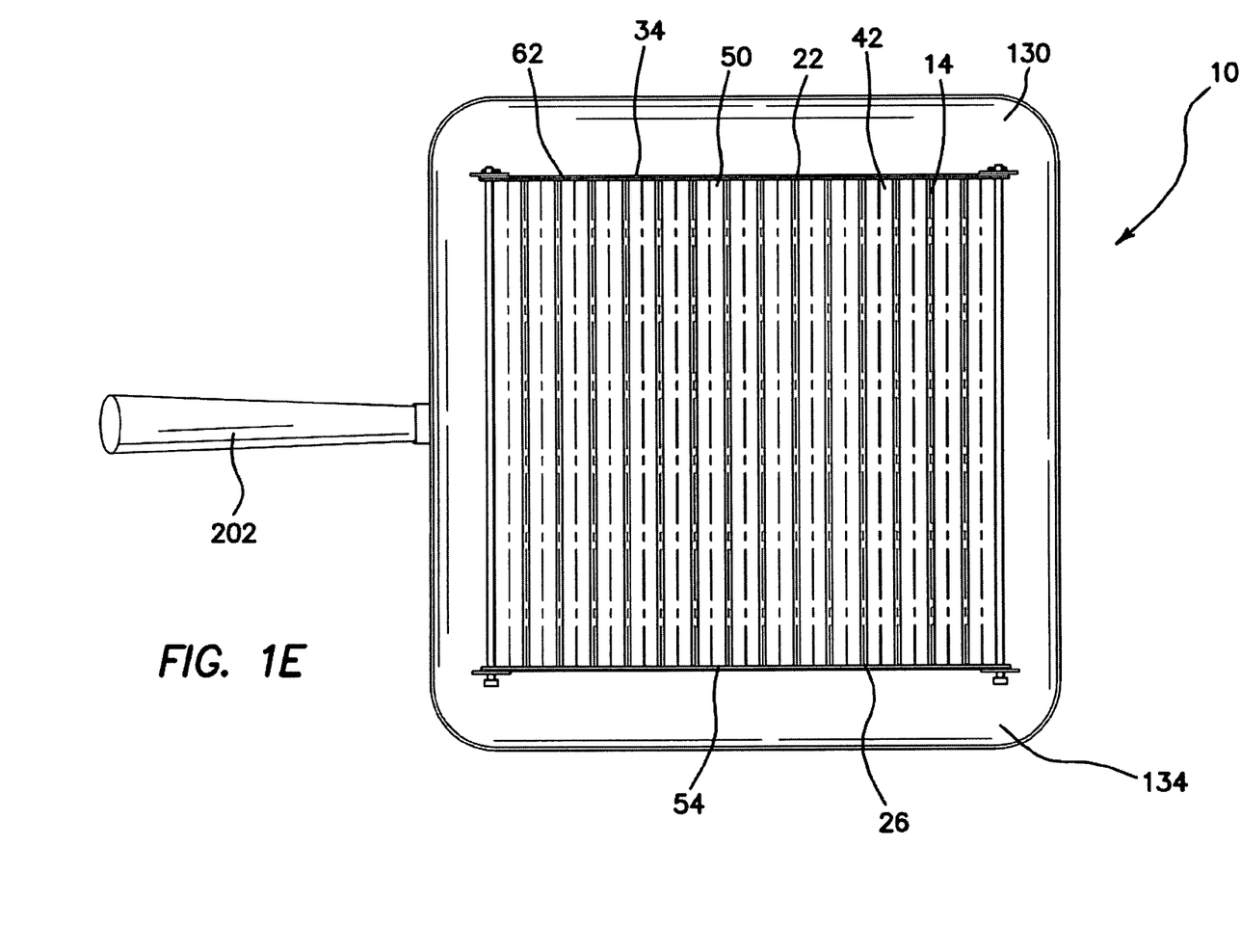
FIG. 1E is a plan view of the FIG. 1 embodiment illustrating a front mounted central handle.

(23) In still another variant, as illustrated in FIG. 1E, the grilling device 10 further includes a central handle 202 attached to the front side of the grill 10.

(24) In a further variant, the first predetermined distance 90 ranges from 0.1-0.4 inches.

(25) In still a further variant of the invention, as illustrated in FIG. 2A, spacing 206 between planar surfaces 210, 214 of the first members 18 and the second members 46 ranges from 0.075-0.375 inches.

(26) In still a further variant, each of the first 18 and second 46 V-shaped members further includes an portion 218 at an apex 222 of the V-shaped members 18, 46.

(27) In another variant of the invention, the portion 218 has a radius ranging from 0.10 to 0.75 inches.

Figure 6:
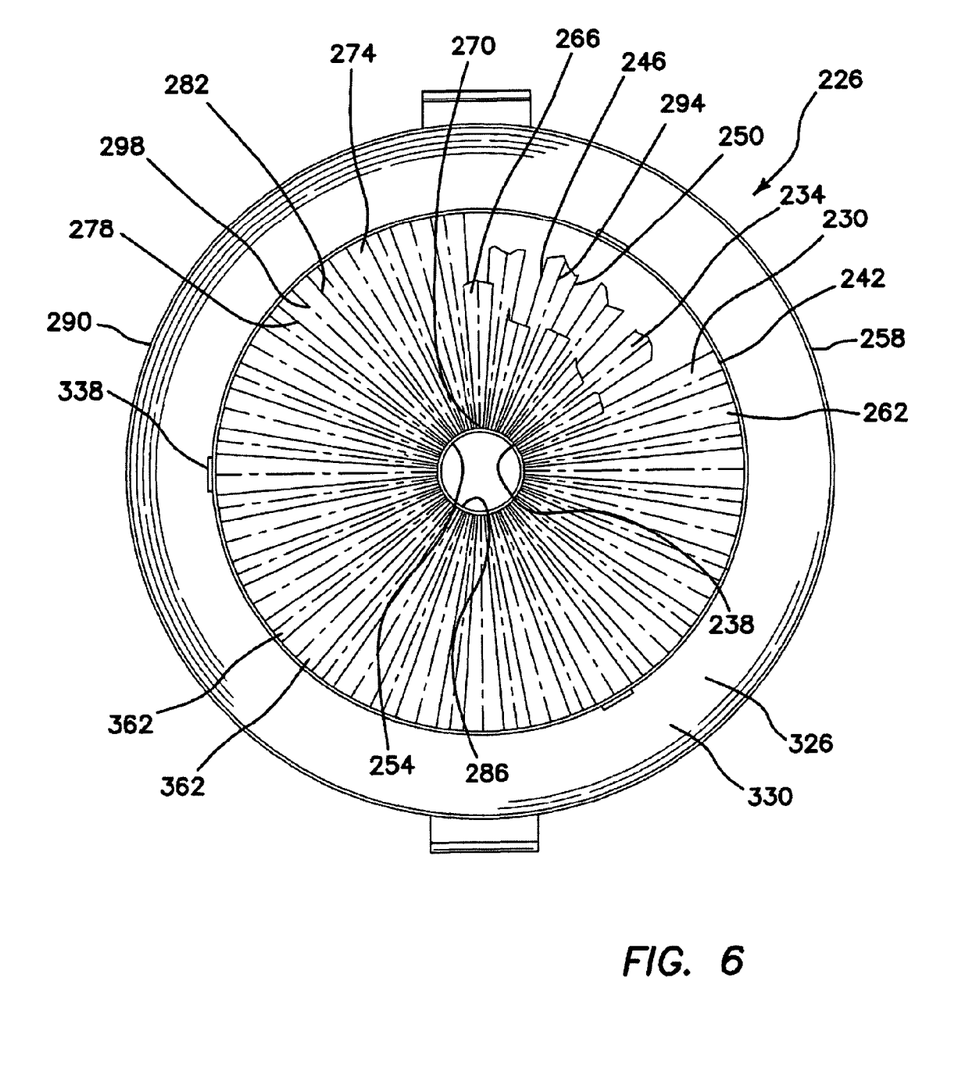
FIG. 6 is a plan view of a circular grill pan having equal size catch tray and grilling surface members.
Figure 7:
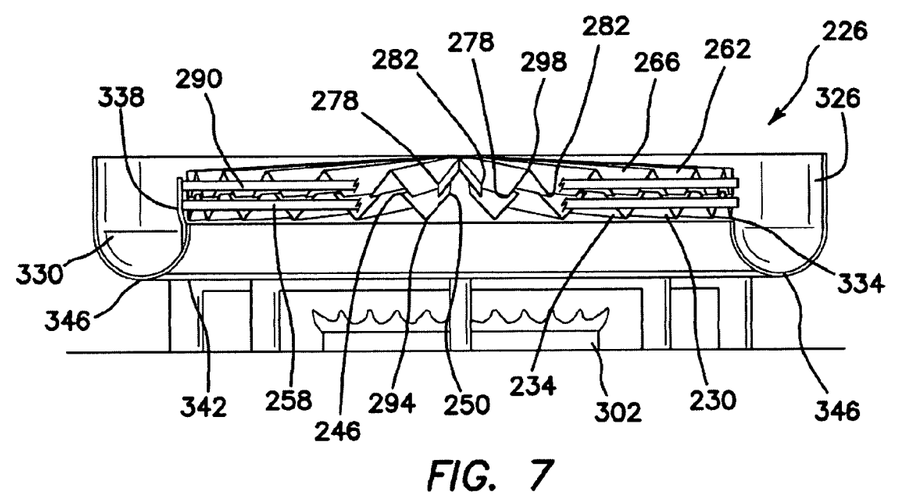
FIG. 7 is a side cross-sectional view of the FIG. 6 embodiment illustrating the sloping of the catch tray members toward the circular grease reservoir.
Figure 8:
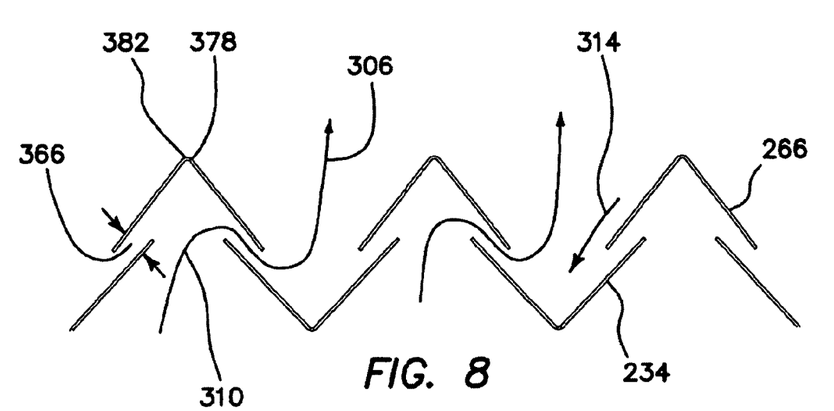
FIG. 8 is a partial side cross-sectional view of the catch tray and the grilling surface of FIG. 6 illustrating the flow of heat and grill drippings.

(28) In still another variant, as illustrated in FIGS. 6-8, a stovetop grilling device 226, includes a catch tray 230. The catch tray 230 has a plurality of downward pointing V-shaped first members 234. Each of the first members 234 has a first end 238, a second end 242, a first side edge 246 and a second side edge 250. The first members 234 are attached at the first ends 238 to a first central supporting ring 254. The first members 234 are located radially outwardly from the first central ring 254 and attached at the second ends 242 to a first outer supporting ring 258. The first members 234 are angled downwardly from the first central supporting ring 254 to the first outer supporting ring 258. A grilling surface 262 is provided. The grilling surface 262 has a plurality of upward pointing V-shaped second members 266. Each of the second members 266 has a proximate end 270, a distal end 274, a first side edge 278 and a second side edge 282. The second members 266 are attached at the proximate ends 270 to a second central supporting ring 286. The second members 266 are located radially outwardly from the second central ring 286 and attached at the distal ends 274 to a second outer supporting ring 290.

The second central supporting ring 286 is located over the first central supporting ring 254 and, as illustrated in FIG. 7, the second outer supporting ring 290 is located over the first outer supporting ring 258 such that a mid-point 294 between the first 246 and second 250 side edges of each of the first members 234 is centrally located between and below the first 278 and second 282 side edges of two adjacent second members 266. A mid-point 298 between the first 278 and second 282 side edges of each of the second members 266 is centrally located between and above the first 246 and second 250 side edges of two adjacent first members 234. As illustrated in FIG. 8, when the grilling device 226 is placed on a stovetop burner 302 and food (not shown) is placed on the grilling surface 262 and the burner 302 activated, heat 306 from the burner 302 will follow an angled path 310 upward to the grilling surface 262 and drippings 314 from the food will follow a downward path 318 to the catch tray 230.

Figure 11:
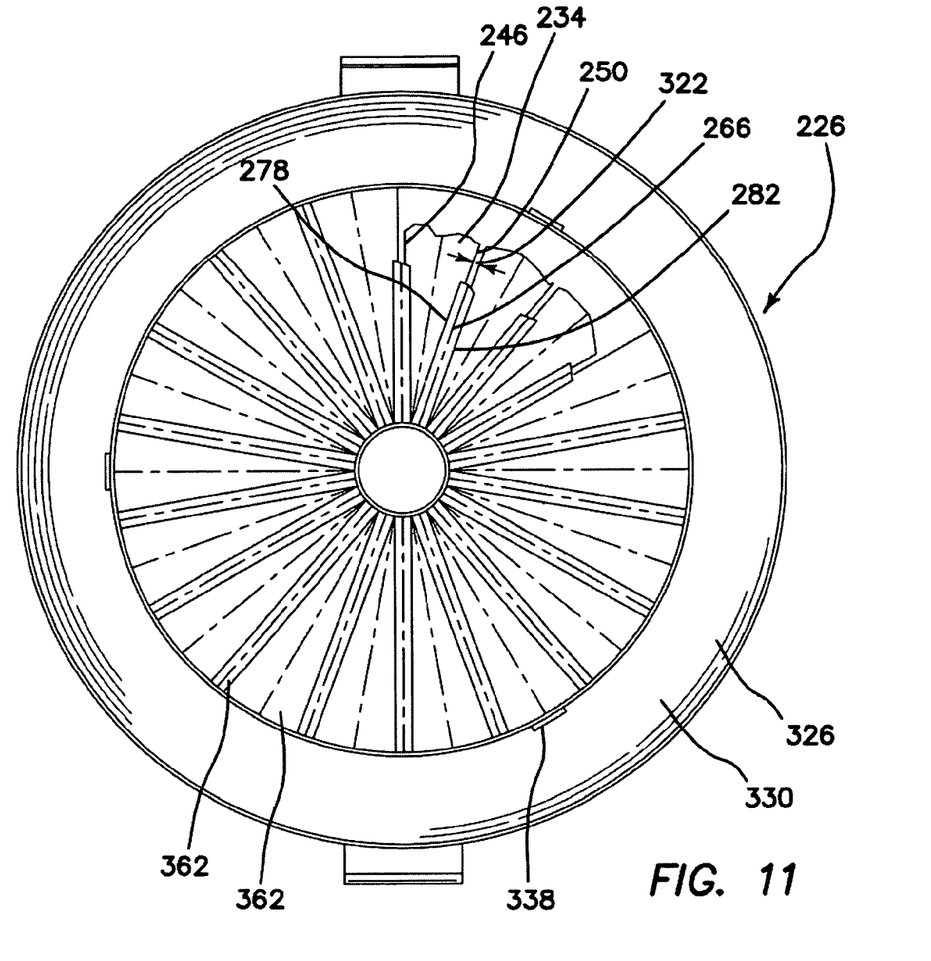
FIG. 11 is a plan view of a third embodiment of the circular grill pan having catch tray members with parallel side edges and uniform spacing between adjacent catch tray elements.
Figure 12:
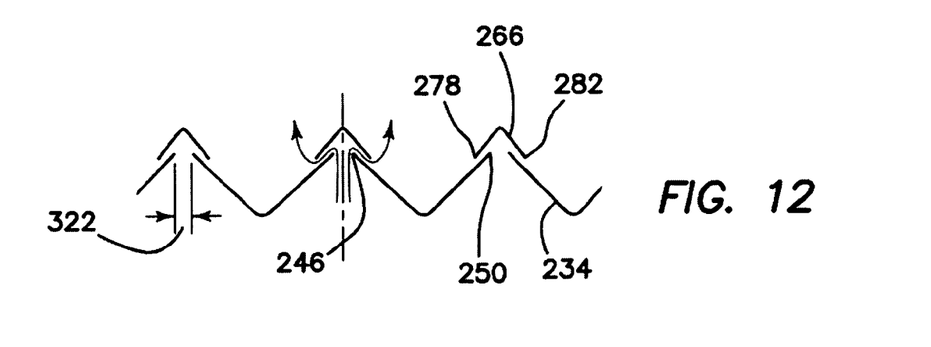
FIG. 12 is a partial side cross-sectional view of the catch tray and the grilling surface of FIG. 11 illustrating the flow of heat and grill drippings.

(29) In yet another variant, as illustrated in FIGS. 11 and 12, the first 234 members are sized and shaped such that the first 246 and second 250 side edges of adjacent first members 234 are parallel and spaced apart by a second predetermined distance 322 and the first 278 and second 282 side edges of adjacent second members 266 are located over the first 246 and second 250 side edges of the adjacent first members 234.

Figures 9, 10:
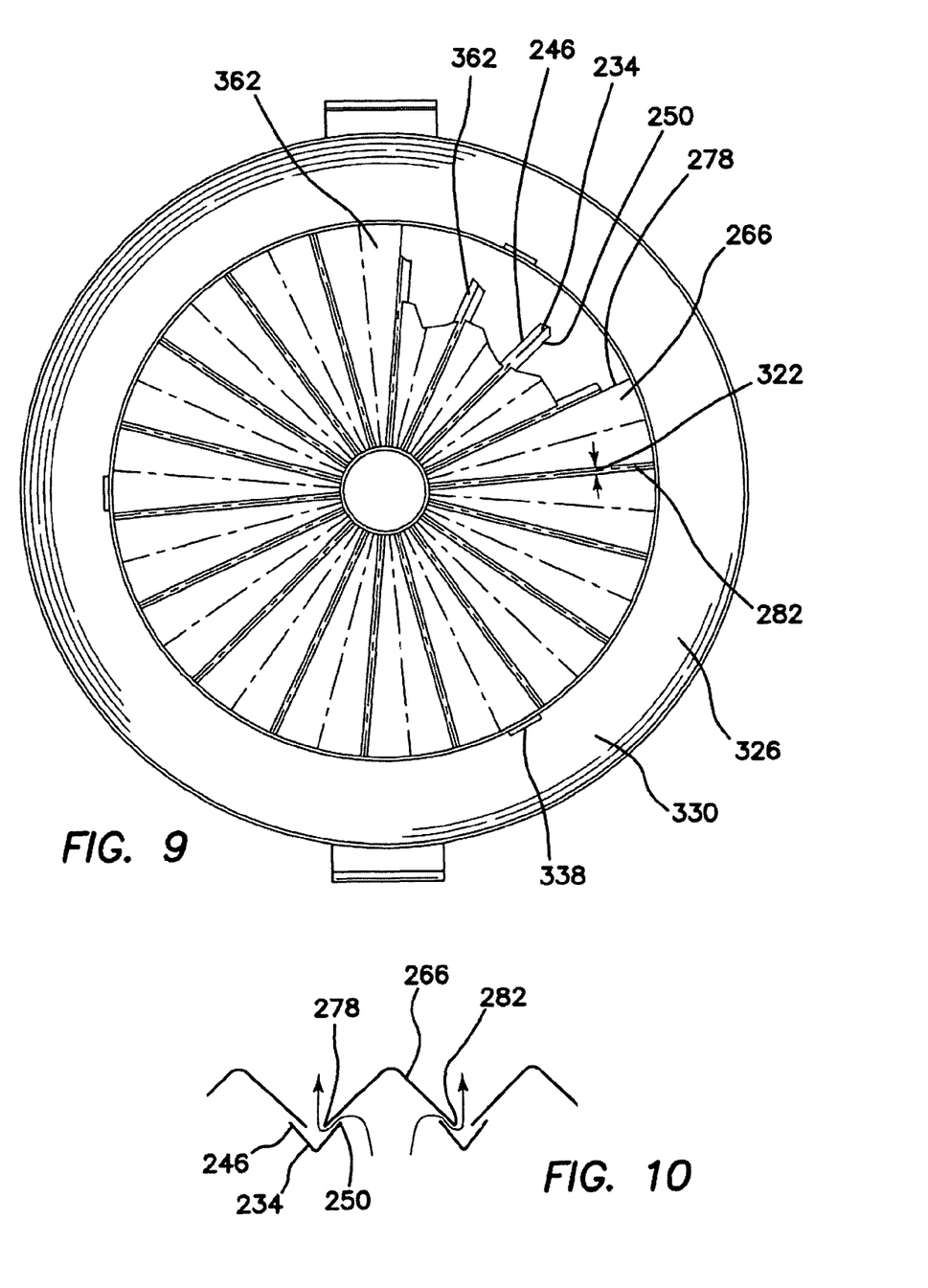
FIG. 9 is a plan view of a second embodiment of the circular grill pan having grilling surface members with parallel side edges and uniform spacing between adjacent grilling surface elements.
FIG. 10 is a partial side cross-sectional view of the catch tray and the grilling surface of FIG. 9 illustrating the flow of heat and grill drippings.

(30) In another variant, as illustrated in FIGS. 9 and 10, the second members 266 are sized and shaped such that the first 278 and second 282 side edges of adjacent second members 266 are parallel and spaced apart by a second predetermined distance 322 and the first 246 and second 250 side edges of adjacent first members 234 are located under the first 278 and second 282 side edges of the adjacent second members 266.

(31) In a further variant, as illustrated in FIGS. 11 and 12, the second predetermined distance 322 ranges from 0.1-0.4 inches.

(32) In a further variant, as illustrated in FIGS. 9 and 10, the second predetermined distance 322 ranges from 0.1-0.4 inches.

(33) In still a further variant, as illustrated in FIGS. 6-8, the first 234 and second 266 members are sized and shaped such that the first 246 and second 250 side edges of adjacent first members 234 are closely spaced adjacent the first central supporting ring 254 and spaced farther apart adjacent the first outer supporting ring 258. The first 278 and second 282 side edges of adjacent second members 266 are closely spaced adjacent the second central supporting ring 286 and spaced farther apart adjacent the second outer supporting ring 290.

(34) In yet a further variant, as illustrated in FIGS. 6, 7, 9 and 11, a circular drip reservoir 326 is provided. The drip reservoir 326 is formed as a circular trough 330 and is disposed below lowest points 334 of the second ends 242 of the first members 234.

Figure 13:
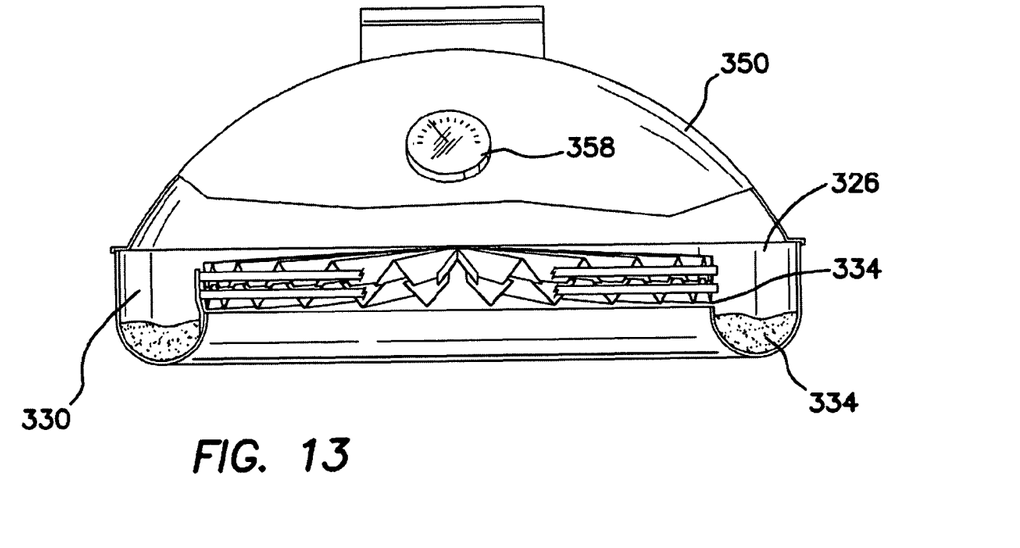
FIG. 13 is a side cross-sectional view of the FIG. 6 embodiment illustrating a lid with a thermometer attached.

(35) In another variant of the invention, as illustrated in FIG. 13, a grease-trapping liquid 334 located in the circular drip reservoir 326.

(36) In still another variant, as illustrated in FIGS. 6, 9 and 11, the catch tray 230 is attached to the grilling surface 262 with at least one positioning bracket 338.

(37) In yet another variant, as illustrated in FIG. 2, a stabilizing brace 342 is provided. The stabilizing brace 342 is attached to a lower surface 346 of the drip reservoir 326 and is sized and shaped to provide a stable surface to position the grilling device 226 upon the stovetop burner 302.

Figure 14:
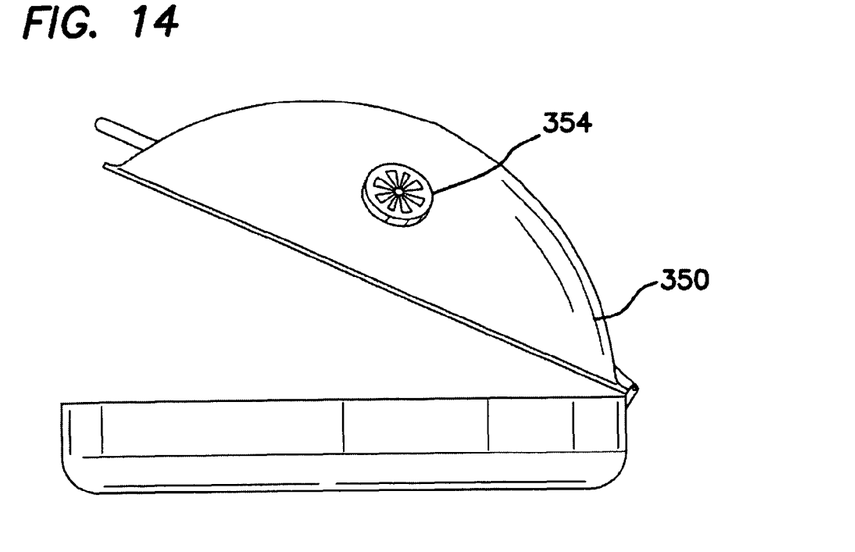
FIG. 14 is a side view of the FIG. 6 embodiment illustrating a lid with an adjustable vent.

(38) In a further variant, as illustrated in FIGS. 13 and 14, a cover 350 is provided. The cover 350 is sized and shaped to enclose the grilling surface 262.

(39) In still a further variant, the cover 350 includes a vent 354.

(40) In yet a further variant, the vent 354 is adjustable to control air flow through the cover 350.

(41) In another variant of the invention, the cover 350 includes a thermometer 358.

(42) In still another variant, as illustrated in FIGS. 6, 9 and 11, any of the first 234 and second 266 members are coated with a non-stick surface 362.

(43) In yet another variant, as illustrated in FIG. 8, spacing 366 between planar surfaces 370, 374 of the first members 234 and the second members 266 ranges from 0.075-0.375 inches.

(44) In a further variant, each of the first 234 and second 266 V-shaped members further includes an portion 378 at an apex 382 of the V-shaped members 234, 266.

(45) In a final variant of the invention, the portion 378 has a radius ranging from 0.10 to 0.75 inches.

The stovetop grilling device 10 has been described with reference to particular embodiments. Other modifications and enhancements can be made without departing from the spirit and scope of the claims that follow.

The invention claimed is:
1. A stovetop grilling device, comprising:
a catch tray, said catch tray having a plurality of downward pointing V-shaped first members, each of said first members having a first end, a second end and parallel side edges;
said first members being attached at said first and second ends to a first supporting frame and have said side edges spaced from one another by a first distance;
a grilling surface, said grilling surface having a plurality of upward pointing V-shaped second members, each of said second members having a proximate end, a distal end and parallel side edges;
said second members being attached at said proximate and distal ends to a second supporting frame and having said side edges spaced from one another by said first distance;
said first distance is smallest at center points of said catch tray and said grilling surface and increasing along a line orthogonal to said parallel side edges moving outwardly from said center points;
said first distance is uniform for said catch tray and said grilling surface at any given point along said orthogonal line;
said second supporting frame is located over said first supporting frame such that a mid-point between said parallel side edges of each of said first members is centrally located between and below said parallel side edges of two adjacent second members and a mid-point between said parallel side edges of each of said second members is centrally located between and above said parallel side edges of two adjacent first members; and
whereby, when said grilling device is placed on a stovetop burner and food is placed on said grilling surface and said burner activated, heat from said burner will follow an angled path upward to said grilling surface and drippings from said food will follow a downward path to said catch tray and a substantially even temperature is maintained across said grilling surface from said center point to outer edges thereof.

2. A stovetop grilling device, comprising:
a catch tray, said catch tray having a plurality of downward pointing V-shaped first members, each of said first members having a first end, a second end and parallel side edges;
said first members being attached at said first and second ends to a first supporting frame and have said side edges spaced from one another by a first distance;
a grilling surface, said grilling surface having a plurality of upward pointing V-shaped second members, each of said second members having a proximate end, a distal end and parallel side edges;
said second members being attached at said proximate and distal ends to a second supporting frame and have said side edges spaced from one another by said first distance;
said first distance increases exponentially from center points to outer edges of said catch tray and said grilling surface;
said second supporting frame is located over said first supporting frame such that a mid-point between said parallel side edges of each of said first members is centrally located between and below said parallel side edges of two adjacent second members and a mid-point between said parallel side edges of each of said second members is centrally located between and above said parallel side edges of two adjacent first members; and
whereby, when said grilling device is placed on a stovetop burner and food is placed on said grilling surface and said burner activated, heat from said burner will follow an angled path upward to said grilling surface and drippings from said food will follow a downward path to said catch tray.

3. The stovetop grilling device, as described in claim 1 or 2, further comprising:
a drip reservoir, said drip reservoir located adjacent a first side of said first supporting frame below a lowest level of said first members; and
said first members is attached to said first support frame at an angle sufficient to cause said drippings to flow downwardly along said first members and into said drip reservoir.

4. The stovetop grilling device, as described in claim 3, further comprising a grease-trapping liquid located in said drip reservoir.

5. The stovetop grilling device, as described in claim 1 or 2, further comprising:
a first drip reservoir, said first drip reservoir located adjacent a first side of said first supporting frame below a lowest level of said first members;
a second drip reservoir, said second drip reservoir located adjacent a second side of said first supporting frame below said lowest level of said first members; and
said first members having a high point located between said first and second ends, said high point causing said drippings to flow downwardly along said first members and into said first and second drip reservoirs.

6. The stovetop grilling device, as described in claim 5, further comprising a grease-trapping liquid located in said first and second drip reservoirs.

7. The stovetop grilling device, as described in claim 1 or 2, wherein said catch tray is pivotally attached to said grilling surface at at least one first hinge.

8. The stovetop grilling device, as described in claim 7, wherein said catch tray is removable from said grilling surface at said at least one first hinge.

9. The stovetop grilling device, as described in claim 1 or 2, wherein said catch tray is attached to said grilling surface with at least one positioning bracket.

10. The stovetop grilling device, as described in claim 5, further comprising a stabilizing brace, said stabilizing brace attached to a lower surface of said drip reservoirs and is sized and shaped to provide a stable surface to position said grilling device upon said stovetop burner.

11. The stovetop grilling device, as described in claim 1 or 2, further comprising a cover, said cover is sized and shaped to enclose said grilling surface.

12. The stovetop grilling device, as described in claim 11, wherein said cover is pivotally attached to said grilling surface at least one second hinge.

13. The stovetop grilling device, as described in claim 12, wherein said cover is removable from said grilling surface at said at least one second hinge.

14. The stovetop grilling device, as described in claim 11, wherein said cover fits slidably over said grilling surface.

15. The stovetop grilling device, as described in claim 11, wherein said cover further comprises a vent.

16. The stovetop grilling device, as described in claim 15, wherein said vent is adjustable to control air flow through said cover.

17. The stovetop grilling device, as described in claim 11 wherein said cover further comprises a thermometer.

18. The stovetop grilling device, as described in claim 11, wherein said cover further comprises a handle.

19. The stovetop grilling device, as described in claim 1 or 2, wherein any of said first and second members are coated with a non-stick surface.

20. The stovetop grilling device, as described in claim 1 or 2, wherein said grilling device further comprises lifting handles attached to each side of said grill.

21. The stovetop grilling device, as described in claim 1 or 2, wherein said grilling device further comprises a central handle attached to a front side of said grill.

22. The stovetop grilling device, as described in claim 1 or 2, wherein spacing between planar surfaces of said first members and said second members ranges from 0.075-0.375 inches.

23. The stovetop grilling device, as described in claim 1 or 2, wherein each of said first and second V-shaped members further comprises an arcuate portion at an apex of said V-shaped members.

24. The stovetop grilling device, as described in claim 23, wherein said arcuate portion has a radius ranging from 0.10 to 0.75 inches.

25. A stovetop grilling device, comprising:
a catch tray, said catch tray having a plurality of downward pointing V-shaped first members, each of said first members having a first end, a second end, a first side edge and a second side edge;
said first members are attached at said first ends to a first central supporting ring, disposed radially outwardly from said first central ring and attached at said second ends to a first outer supporting ring;
said first members angled downwardly from said first central supporting ring to said first outer supporting ring;
a grilling surface, said grilling surface having a plurality of upward pointing V-shaped second members, each of said second members having a proximate end, a distal end, a first side edge and a second side edge;
said second members are attached at said proximate ends to a second central supporting ring, disposed radially outwardly from said second central ring and attached at said distal ends to a second outer supporting ring;

said second central supporting ring is located over said first central supporting ring and said second outer supporting ring is located over said first outer supporting ring such that a mid-point between said first and second side edges of each of said first members is centrally located between and below said first and second side edges of two adjacent second members and a mid-point between said first and second side edges of each of said second members is centrally located between and above said first and second side edges of two adjacent first members; and said first members are sized and shaped such that said first and second side edges of adjacent first members are parallel and spaced apart by a second predetermined distance and said first and second side edges of adjacent second members are disposed over said first and second side edges of said adjacent first members;

whereby, when said grilling device is placed on a stovetop burner and food is placed on said grilling surface and said burner activated, heat from said burner will follow an angled path upward to said grilling surface and drippings from said food will follow a downward path to said catch tray.

26. The stovetop grilling device, as described in claim 25, wherein said second predetermined distance ranges from 0.1-0.4 inches.

27. A stovetop grilling device, comprising:

a catch tray, said catch tray having a plurality of downward pointing V-shaped first members, each of said first members having a first end, a second end, a first side edge and a second side edge;

said first members are attached at said first ends to a first central supporting ring, disposed radially outwardly from said first central ring and attached at said second ends to a first outer supporting ring;

said first members angled downwardly from said first central supporting ring to said first outer supporting ring;

a grilling surface, said grilling surface having a plurality of upward pointing V-shaped second members, each of said second members having a proximate end, a distal end, a first side edge and a second side edge;

said second members are attached at said proximate ends to a second central supporting ring, disposed radially outwardly from said second central ring and attached at said distal ends to a second outer supporting ring;

said second central supporting ring is located over said first central supporting ring and said second outer supporting ring is located over said first outer supporting ring such that a mid-point between said first and second side edges of each of said first members is centrally located between and below said first and second side edges of two adjacent second members and a mid-point between said first and second side edges of each of said second members is centrally located between and above said first and second side edges of two adjacent first members; and said second members are sized and shaped such that said first and second side edges of adjacent second members are parallel and spaced apart by a second predetermined distance and said first and second side edges of adjacent first members are disposed under said first and second side edges of said adjacent second members whereby, when said grilling device is placed on a stovetop burner and food is placed on said grilling surface and said burner activated, heat from said burner will follow an angled path upward to said grilling surface and drippings from said food will follow a downward path to said catch tray.

28. The stovetop grilling device, as described in claim 27, wherein said second predetermined distance ranges from 0.1-0.4 inches.

29. The stovetop grilling device, as described in claim 25 or 27, further comprising a circular drip reservoir, said drip reservoir formed as a circular trough and being disposed below lowest points of said second ends of said first members.

30. The stovetop grilling device, as described in claim 29, further comprising a grease-trapping liquid located in said circular drip reservoir.

31. The stovetop grilling device, as described in claim 25 or 27, wherein said catch tray is attached to said grilling surface with at least one positioning bracket.

32. The stovetop grilling device, as described in claim 29, further comprising a stabilizing brace, said stabilizing brace attached to a lower surface of said drip reservoir and is sized and shaped to provide a stable surface to position said grilling device upon said stovetop burner.

33. The stovetop grilling device, as described in claim 25 or 27, further comprising a cover, said cover being sized and shaped to enclose said grilling surface.

34. The stovetop grilling device, as described in claim 25 or 27, wherein said cover further comprises a vent.

35. The stovetop grilling device, as described in claim 25 or 27, wherein said vent is adjustable to control air flow through said cover.

36. The stovetop grilling device, as described in claim 25 or 27, wherein said cover further comprises a thermometer.

37. The stovetop grilling device, as described in claim 25 or 27, wherein any of said first and second members are coated with a non-stick surface.

38. The stovetop grilling device, as described in claim 25 or 27, wherein spacing between planar surfaces of said first members and said second members ranges from 0.075-0.375 inches.

39. The stovetop grilling device, as described in claim 25 or 27, wherein each of said first and second V-shaped members further comprises an arcuate portion at an apex of said V-shaped members.

40. The stovetop grilling device, as described in claim 39, wherein said arcuate portion having a radius ranging from 0.10 to 0.75 inches.

* * * * *